Oct. 27, 1970     R. J. KUNTZ     3,535,879
CATALYST PACK

Filed Jan. 18, 1968     2 Sheets-Sheet 1

INVENTOR.
ROBERT J. KUNTZ
BY
J. Gordon Angus
ATTORNEY.

Oct. 27, 1970    R. J. KUNTZ    3,535,879
CATALYST PACK
Filed Jan. 18, 1968    2 Sheets-Sheet 2
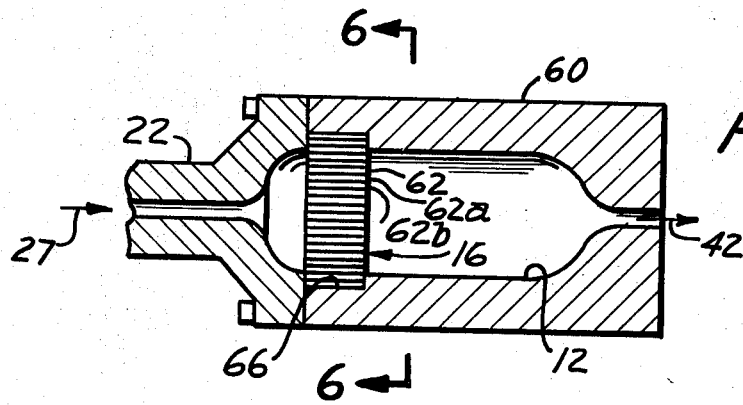
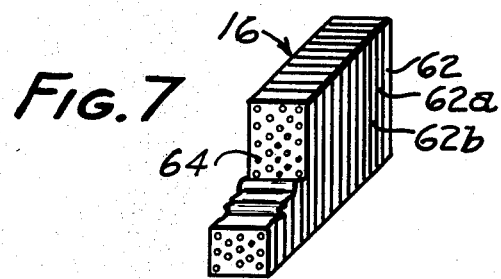
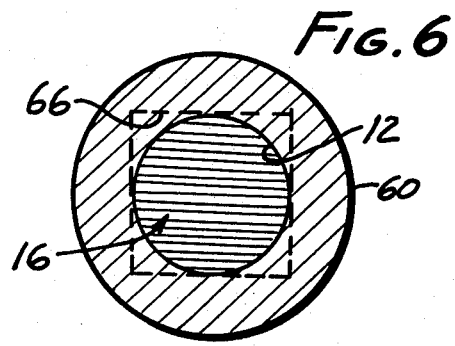
INVENTOR.
ROBERT J. KUNTZ
BY
ATTORNEY.

# United States Patent Office 3,535,879
Patented Oct. 27, 1970

3,535,879
CATALYST PACK
Robert J. Kuntz, Rancho Cordova, Calif., assignor to Aerojet-General Corporation, El Monte, Calif., a corporation of Ohio
Filed Jan. 18, 1968, Ser. No. 698,856
Int. Cl. F02k
U.S. Cl. 60—200                        29 Claims

ABSTRACT OF THE DISCLOSURE

This disclosure relates to catalyst packs, and particularly to catalyst packs for use in gas generators, rocket engines and the like.

A catalyst pack according to the present disclosure comprises a stack of a plurality of wafers each having a flow passage therein permitting flow of propellant therethrough. The flow passages contain a suitable catalyst material. A suitable inert material may be formed over the catalyst material to prevent deterioration of the catalyst material.

---

This invention relates to catalyst packs, and particularly to catalyst packs for use in gas generators, rocket engines, and the like.

Catalyst packs are useful in gas generators, and particularly in gas generators utilizing monopropellant, to decompose a liquid propellant to form a gas. The expanded gas is discharged through an exhaust opening, or when the gas generator is utilized as a rocket engine, the expanded gas is discharged through a nozzle to propel the rocket. Certain propellants, and particularly certain monopropellants, decompose in the presence of certain catalysts. For example, liquid hydrogen peroxide, when used as a monopropellant, is capable of decomposing in the presence of silver to form an expanded gas to propel rockets. The catalyst pack, therefore, is useful for starting gas generators as well as for sustaining the decomposition process. Furthermore, catalyst packs may be used in connection with, or instead of, conventional hot ignition systems.

Heretofore, catalyst packs for use in gas generators have been made by drawing the catalyst material into a wire and weaving the wire to form a screen. The screen and thereafter stacked with other similarly constructed is then coated with a porous rare earth material and thereafter stacked with other similarly constructed screens to form the catalyst pack. The stacked screens are usually compressed, a typical equivalent compression pressure being 4500 p.s.i.

A typical catalyst pack for a monopropellant such as hydrogen peroxide ($H_2O_2$) utilizes screens constructed of silver and coated with samarium oxide. The samarium oxide is usually formed on the silver wire by coating the wire with samarium nitrate and subsequently baking it in an oven to form samarium oxide.

The purpose of a rare earth coating (such as samarium oxide) over the catalyst material (such as silver) is to prevent oxides (such as silver oxide) from forming on the catalyst material which reduce the effectiveness of the catalyst. Although silver oxide will wash out due to the heat of a rocket engine, the oxide will impede the activity of the catalyst when the catalyst is cold, for example, when the engine is being started. The rare earth deposited over the silver catalyst is sufficient porous to permit ion migration of the silver through the inert rare earth material to decompose the peroxide propellant.

One problem with prior catalyst packs utilizing catalyst screens is that upon compression of the screens, cracks are often formed in the rare earth coating. These cracks tend to cause deterioration in the operation of the pack after a period of time by allowing direct contact of the propellant with the catalyst material. Furthermore, since the screens are relatively soft, they tend to mash together so that the pack compaction deteriorates over a period of time, thereby resulting in pack instability, deterioration of the dynamic characteristics of the pack, and an increase in the pressure drop across the catalyst pack.

It is an object of the present invention to provide a catalyst pack whose dynamic characteristics are not significantly altered over a period of time.

Another object of the present invention is to provide a catalyst pack having relatively high stability and substantial control of the decomposition of propellant passing therethrough.

A catalyst pack according to the present invention comprises a stack of a plurality of wafers each having passages therein permitting passage of propellant therethrough. The passages contain a catalytic material. A suitable porous rare earth material may be formed over the catalyst material to prevent deterioration of the catalyst material.

According to one form of the invention, the wafers are made of the catalytic material, in which event the passages are coated with the porous rare earth material.

According to another form of the invention, the wafers are constructed of a suitable structural material and are coated with catalytic material, which in turn is coated with the porous rare earth material.

According to one feature of the present invention, the composition of the catalyst material may be varied throughout different regions of the wafer so that the catalyst pack will not be deteriorated by elevated temperatures.

Another feature of the present invention resides in a catalyst pack which may be disassembled and the catalyst pack may be rejuvenated.

The above and other features of the present invention will be more fully understood from the following detailed description and the accompanying drawings, in which:

FIG. 5 is a side view elevation in cutaway cross-section of a rocket engine containing a catalyst pack according to another embodiment of the present invention;

FIG. 6 is a section taken at line 6—6 in FIG. 5; and

FIG. 7 is a partly cutaway perspective view of the catalyst pack illustrated in FIGS. 5 and 6.

Figure 1:
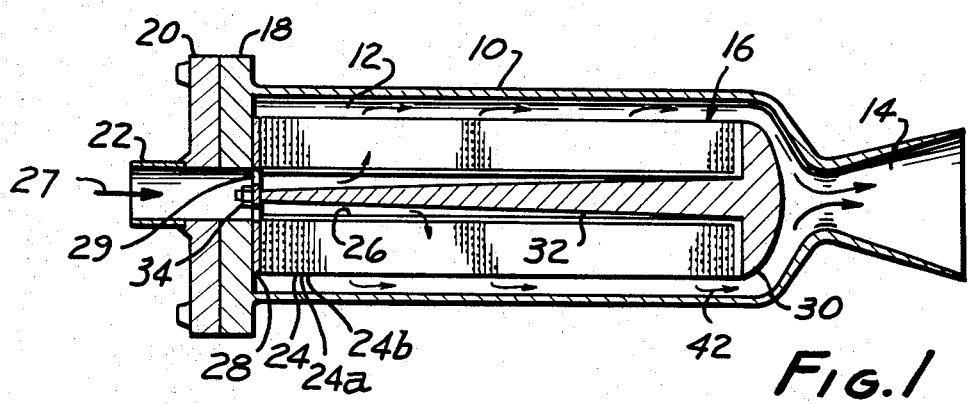
FIG. 1 is a side view elevation in cutaway cross-section of a rocket engine containing a catalyst pack according to the presently preferred form of the present invention.

Referring now to the drawings, and particularly to FIG. 1, there is illustrated the presently preferred form of a catalyst pack 16 according to the present invention, mounted within a rocket motor 10 having a gas chamber 12 and a nozzle 14. The catalyst pack 16 is mounted within gas chamber 12 and is in fluid communication through plate 18 and fitting 20 to a suitable source of propellant (not shown). By way of example, fitting 20 is connected to the source of liquid propellant through conduit 22 and is mounted to plate 18. The propellant may be any suitable propellant, for example a monopropellant such as hydrogen peroxide ($H_2O_2$) or hydrazine ($N_2H_4$).

Catalyst pack 16 comprises a stack of a plurality of wafers 24, 24a, 24b . . . . The wafers, as stacked, form a passage 26 in the catalyst pack which is in fluid communication with conduit 22 through plate 28 mounted to plate 18. As will be more fully explained hereinafter, a planar surface of each of the wafers forming the catalyst pack contains a flow passage 46 (FIG. 3) coated with catalyst material. The flow passages include a plurality of flow diverters 44 (FIG. 3), and provide fluid communication between passage 26 and the exterior of the catalyst pack in gas chamber 12. The flow diverters are posts or islands extending above the floor of the flow passages on each wafer and provide space for the passages across the wafer surfaces as well as a convenient means for supporting loads when the wafers are compacted into a catalyst pack. The exposed surface of the flow diverter is provided with catalyst material, thereby increasing the catalytic surface area of the wafer. Furthermore, the flow diverters control the flow of liquid across the wafer surface through the flow passages. Plate 30 abuts the most downstream wafer and includes a shank 32 connected to plate 28 by means of suitable fastener means such as bolt 34. Plate 28 includes suitable apertures 29 to provide fluid communication between passage 26 and conduit 22. Preferably, conduit 26 is substantially cylindrical, and shank 32 is substantially frusto-conical having its base integral with plate 30. As liquid propellant flows downstream through conduit 26 in the direction of arrows 27, it is evenly distributed by the body of shank 32 toward and through wafers 24.

Figure 2:
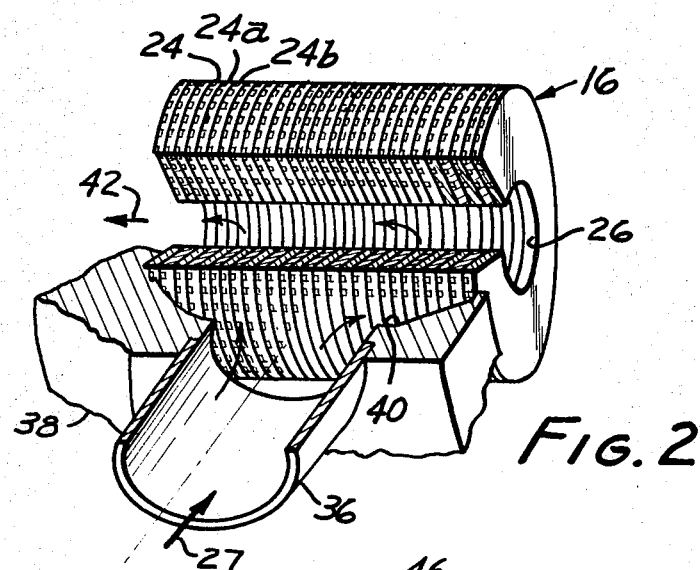
FIG. 2 is a partly cutaway perspective view of another embodiment of a catalyst pack according to the present invention.

Although FIG. 1 illustrates the use of a radial flow catalyst pack wherein flow is made outward from the center of the pack, it is to be understood that a catalyst pack may utilize radial in-flow of propellant. Such an arrangement is illustrated in FIG. 2 wherein the catalyst pack 16 is formed of stacked wafers 24, 24a, 24b . . . thereby forming conduit conduit 26 therein. Conduit 36 is in fluid communication with a source of liquid propellant and is associated with the catalyst pack through housing 38 in such a manner that the propellant flows toward the catalyst pack from its outside. Housing 38 is provided with a manifold arrangement 40 to distribute the liquid propellant around the exterior of the catalyst pack. The propellant flows through the catalyst pack towards conduit 26 and is exhausted in the direction of arrows 42.

Figures 3, 4:
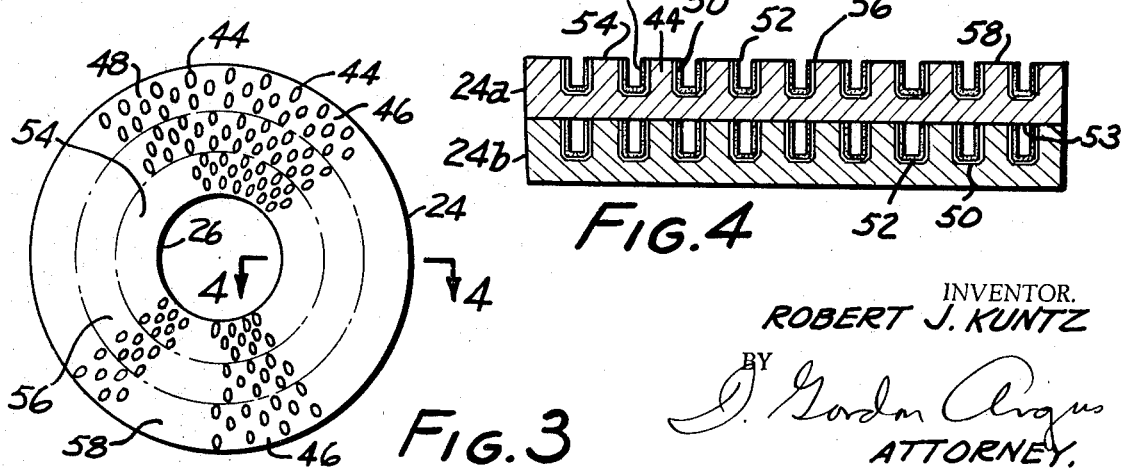
FIG. 3 is a top view elevation of a wafer for use in a catalyst pack according to the present invention.
FIG. 4 is a view taken at line 4—4 in FIG. 3.

The catalyst pack according to the present invention comprises a stack of a plurality of wafers 24, 24a, 24b . . . illustrated particularly in FIGS. 3 and 4. Each wafer includes a flow passage 46 on a planar surface of the wafer. A plurality of flow diverters 44 is disposed in the flow passage 46 to divert flow of propellant around the diverters to attain maximum contact between the propellant and the passage surface. As shown particularly in FIG. 3, diverters 44 are arranged in a controlled offset pattern to facilitate the diversion of propellant flow and the contacting of the propellant with the passage surface. The flow passages terminate in a porous end wall formed by the spacing between adjacent flow diverters 44 both at the interior passage 26 and the exterior surface 48 of the catalyst pack.

As illustrated particularly in FIG. 4, a layer of catalyst material 50 is deposited on the surfaces of passage 46 and on the exposed surfaces of the flow diverters 44. A layer of suitable inert or rare earth material 52, such as samarium oxide, may be deposited over catalyst coating 50. The inert material protects catalyst materials which tend to deteriorate or oxidize when exposed to atmosphere or an oxidizing agent. For example, silver catalysts tend to be oxidized by hydrogen peroxide propellant, an oxidizer, and the samarium oxide prevents oxidation of a silver catalyst.

The wafer is constructed of a material having a high resilience which will consequently not be readily deformable under the pressures or temperatures produced within gas chamber 12. The wafers may be constructed of catalyst material or may be constructed of a suitable non-catalytic material having catalyst material 50 deposited over all portions of the flow passage which will be exposed to the propellant. The nonchanneled planar surface 53 may or may not be coated with catalyst and rare earth oxide, dependent upon design and convenience. By way of example, wafers constructed of non-catalytic substrate, such as nickel, having a layer of silver deposited thereon have been found suitable for use in a catalyst pack for decomposing hydrogen peroxide. Samarium nitrate preferably is deposited over the silver catalyst, and the wafer is subsequently baked in an oven to form a coating of samarium oxide over the silver catalyst to prevent formation of silver oxide.

Wafers 24 are preferably sufficiently thin as to provide a sufficiently porous catalyst pack to thereby prevent severe pressure gradients across the catalyst pack. By way of example, a suitable wafer for a catalyst pack according to the present invention has a thickness of between about 0.010 and 0.020 inch. Flow channels 46 preferably have a depth of between about 0.005 and 0.015 inch. The width of the flow channels (and thus the spacing between adjacent flow diverters 44) is preferably between about 0.005 and 0.015 inch. The sizes of the flow channels depend upon the ability to obtain a suitable deposit of catalyst material over the wafer material as well as a suitable deposit of rare earth material over the catalyst material if needed. Since it is desirable to obtain as much catalyst surface area for a minimal unit volume, it should be recognized that the surface area will be increased as the passages are decreased in size (and consequently the flow diverters are increased in size). However, if the flow passage is too small, an inadequate deposit of catalyst material and/or rare earth material may occur, and air pockets and the like may form in the deposits.

Passages 46 may be formed in the wafers by any suitable process, such as by photo-etching, engraving, stamping, coining, or pressing. After the passages are formed, the passages are coated with catalyst material, such as silver, and thereafter coated with a suitable rare earth material if needed, such as samarium oxide. The catalyst pack is constructed by assembling the wafers in a stack so that the top surfaces of the flow diverters of one wafer contact the bottom planar surface of the next wafer. A suitable bonding agent may be used for holding the wafers together, or, if neither contacting surface of the wafer is coated with catalyst or rare earth material, the wafers may be held together by cohesion by the direct metal-to-metal contact (for example, nickel-to-nickel) between adjacent wafers to prevent slippage of the wafers. As an added precaution, the wafers may be held in proper orientation by a suitable mechanical index. The catalyst pack 16 is then assembled within the gas generator or rocket engine by sandwiching the wafers between plates 30 and 28 and applying a compressional load by axial rotation of fastener 34. The load applied to the wafers is evenly distributed through the catalyst pack from wafer to wafer, through flow diverters 44.

There are certain circumstances in which the temperature of the rocket engine may rise to a level above the normal melting temperature of the catalyst. A monopropellant comprising 90% hydrogen peroxide produces a gas at a temperature of approximately 1400° F. This is below the normal melting temperature of silver, which is about 1700° F. However, monopropellants comprising 98% hydrogen peroxide decompose to produce a gas at a temperature of approximately 1800° F. (above the normal melting point of the silver catalyst). To prevent the catalyst from melting, the silver may be alloyed with a rare metal such as palladium, to provide a catalyst alloy having a higher melting temperature. However, the silver-rare metal alloy is not as active as a catalyst as is pure silver. Therefore, in regions of liquid flow where the propellant is substantially below the melting point of pure silver, it would be desirous to utilize pure silver, while in regions where the temperature of the gas may reach or exceed the melting temperature of silver, the silver should be alloyed with a suitable rare metal.

In FIG. 3 wafer 24 has been divided into three regional sectors 54, 56 and 58, respectively. Sector 54 is closest to the source of liquid propellant in a radial out-flow catalyst pack, and is therefore the coolest of the three regions. For a hydrogen peroxide monopropellant, this sector would contain a catalyst of substantially pure silver. Sector 56 would utilize a catalyst containing silver and a small amount of rare metal such as palladium, while sector 58, the sector subjected to the most severe temperatures, contains an alloy having greater amounts of rare metal. The exact composition of the silver-rare metal alloy will vary in accordance with the region of the wafer and the heat created during decomposition of the propellant.

The principles of a catalyst pack according to the present invention are also useful in rocket engines utilizing bipropellants, for example, hydrogen peroxide ($H_2O_2$) and hydrazine ($N_2H_4$). In this case, a manifold would be provided (not shown) for directing the hydrogen peroxide through passages in one set of wafers, and for directing hydrazine through passages in alternate wafers. Thus each flow of hydrogen peroxide is separated from another flow of hydrogen peroxide by a flow of hydrazine. The flow passages of the wafers adapted to pass the hydrogen peroxide are coated with a suitable silver or silver alloy catalyst, and the heat generated by the decomposition of hydrogen peroxide is transmitted through the thin wafer wall to the flow passages in the adjacent wafers, passing the hydrazine. Although the wafers passing the hydrazine propellant are also coated with some active catalyst, a portion of the propellant is decomposed thermally rather than catalytically. The manifold directs hydrogen peroxide through the passages in one set of wafers and the hydrazine through passages in alternate sets of wafers, and the resulting catalyst pack acts as a combustion initiator for the bipropellant rocket engine; the decomposition occurs in the flow passages and combustion occurs when the fuel and oxidizer come into contact and mix at a point adjacent the porous wall surface formed by the passage-terminating edge surfaces of the stacked wafers.

In FIGS. 5-7 there is illustrated an axial catalyst pack 60. The catalyst pack is mounted in the gas chamber 12 in such a manner that the wafer orientation and the flow passages permit axial flow of propellant through the pack. Wafers 62, 62a, 62b etc. forming the axial catalyst pack have a plurality of flow diverters 64, having a construction similar to diverters 44 illustrated in FIGS. 1-4. A retaining groove 66 is provided in the walls of the gas chamber so that the wafers forming pack 60 may be retained therein. The wafers may be any desired shape, such as rectangular.

As liquid propellant flows through inlet conduit 22 in the direction of arrow 27, the liquid is permitted to flow into the catalyst pack where it is decomposed. The gas is exhausted into the gas chamber 12 in the direction of arrow 42.

Although the present invention describes a catalyst pack for monopropellant systems, such as hydrogen peroxide or hydrazine, and for bipropellant systems such as hydrogen peroxide and hydrazine, it should be recognized that the catalyst pack is capable of handling other monopropellants as well as other bipropellants.

With the catalyst pack in accordance with the present invention, greater stability may be afforded over the compaction of the catalyst pack. The catalyst pack may be constructed of any suitable metal capable of providing the dynamic characteristic desired, as well as being a low-cost material. For example, the nickel wafers provide greater physical stability than silver and at lower cost. The wafer passages may be coated with suitable catalyst material in any suitable manner, such as depositing the material in an electrochemical process. The catalyst pack may vary in size depending upon the number of wafers stacked.

One important feature of the present invention resides in the fact that the catalyst pack may be disassembled by removing fastener 34 and disassembling the wafers. The wafers may then be rejuvenated with fresh catalyst material and re-installed in a rocket engine.

The present invention thus provides a catalyst pack which is easily constructed, economical and reliable. The catalyst pack according to the present invention has a longer life than prior art catalyst packs, because its physical properties are not subject to the drastic changes associated with prior catalyst packs. The dynamic characteristics of the catalyst pack are substantially stable, thereby resulting in pack stability over a long period of use and through multiple re-starts.

What is claimed:

1. A catalyst pack comprising: a stack of a plurality of discrete wafers, each wafer having planar surfaces and edge surfaces; a flow passage on one planar surface of each wafer, each flow passage terminating at an edge surface thereof; a controlled pattern of flow diverters in each flow passage; and a catalyst material forming a surface of each flow passage.

2. A catalyst pack according to claim 1 wherein the flow passage has a plurality of sectors and the catalyst material in one sector has a different melting temperature than the catalyst material in the other sectors.

3. A catalyst pack according to claim 2 wherein the thickness of each wafer between its planar surfaces is between about 0.010 and 0.020 inch.

4. A catalyst pack according to claim 3 wherein the depth of each flow passage is between about 0.005 and 0.015 inch.

5. A catalyst pack according to claim 4 wherein the passage-terminating edge surfaces of the wafers form a porous wall having a plurality of edge surface holes between adjacent flow diverters.

6. A catalyst pack according to claim 5 wherein the space between adjacent flow diverters is between about 0.005 and 0.015 inch.

7. A catalyst pack according to claim 2 wherein an inert material is disposed on the exposed surface of the catalyst material.

8. A catalyst pack according to claim 2 wherein said catalyst material includes silver.

9. A catalyst pack according to claim 7 wherein said inert material includes samarium oxide.

10. A catalyst pack according to claim 2 wherein the catalyst material in each sector includes silver, the silver being alloyed with a rare metal in different quantities in each sector.

11. A catalyst pack according to claim 2 wherein each wafer comprises a non-catalytic substrate having a surface layer of catalyst material.

12. A catalyst pack according to claim 1 wherein the thickness of each wafer between its planar surfaces is between about 0.010 and 0.020 inch.

13. A catalyst pack according to claim 12 wherein the depth of each flow passage is between about 0.005 and 0.015 inch.

14. A catalyst pack according to claim 13 wherein the passage-terminating edge surfaces of the wafers form a porous wall having a plurality of edge surface holes between adjacent flow diverters.

15. A catalyst pack according to claim 14 wherein the space between adjacent flow diverters is between about 0.005 and 0.015 inch.

16. A catalyst pack according to claim 1 wherein each wafer comprises a non-catalytic substrate having a surface layer of catalyst material.

17. A catalyst pack according to claim 1 wherein each wafer is constructed of catalyst material.

18. In a gas generator, a catalyst pack for decomposing a propellant comprising: a stack of a plurality of discrete wafers, each wafer having planar surfaces and edge surfaces; a flow passage on one planar surface of each wafer for passing propellant, each flow passage terminating at an edge surface thereof; a controlled pattern of flow diverters in each flow passage; and a catalyst material capable of decomposing a propellant for said gas generator, said catalyst material forming a surface of each flow passage, whereby propellant passed through said flow passages is decomposed by the presence of the catalyst material.

19. Apparatus according to claim 18 further including an inert material disposed on the exposed surface of the catalyst material.

20. Apparatus according to claim 18 wherein the flow passage has a plurality of sectors and the catalyst material in one sector has a different melting temperature than the catalyst material in the other sectors.

21. Apparatus according to claim 18 wherein the thickness of each wafer between its planar surfaces is between about 0.010 and 0.020 inch.

22. Apparatus according to claim 21 wherein the depth of each flow passage is between about 0.005 and 0.015 inch.

23. Apparatus according to claim 18 wherein the passage-terminating edge surfaces of the wafers form a porous wall having a plurality of edge surface holes between adjacent flow diverters.

24. Apparatus according to claim 23 wherein the space between adjacent flow diverters is between about 0.005 and 0.015 inch.

25. Apparatus according to claim 18 wherein said catalyst pack is so arranged and disposed within said gas generator that propellant flow is directed radially through said flow passages.

26. Apparatus according to claim 18 wherein said catalyst pack is so arranged and disposed within said gas generator that the propellant flow is directed axially through said flow passages.

27. Apparatus according to claim 18 wherein each wafer comprises a non-catalytic substrate having a surface layer of catalyst material.

28. Apparatus according to claim 18 wherein each wafer is constructed of catalyst material.

29. Apparatus according to claim 18 wherein said gas generator is a rocket engine.

References Cited

UNITED STATES PATENTS

| | | | |
|---|---|---|---|
| 1,979,187 | 10/1934 | Bindley | 252—477 |
| 2,809,940 | 10/1957 | Crum | 252—477 |
| 2,865,721 | 12/1958 | Lane et al. | 23—288 |
| 2,887,456 | 5/1959 | Halford et al. | 252—477 |
| 3,091,520 | 5/1963 | Newburn | 23—288 |
| 3,135,703 | 6/1964 | Sill | 252—477 |

SAMUEL FEINBERG, Primary Examiner

U.S. Cl. X.R.

23—288; 252—477